United States Patent [19]

Terajima

[11] Patent Number: 5,428,675
[45] Date of Patent: Jun. 27, 1995

[54] COMMUNICATION APPARATUS

[75] Inventor: Hisao Terajima, Yokohama, Japan

[73] Assignee: Canon Kabushiki Kaisha, Tokyo, Japan

[21] Appl. No.: 199,966

[22] Filed: Feb. 22, 1994

Related U.S. Application Data

[63] Continuation of Ser. No. 826,821, Jan. 28, 1992, abandoned.

[30] Foreign Application Priority Data

Jan. 28, 1991 [JP] Japan ................... 3-008499
Jan. 28, 1991 [JP] Japan ................... 3-008500

[51] Int. Cl.⁶ ........................................... H04M 11/00
[52] U.S. Cl. ................................... 379/100; 358/400
[58] Field of Search .......... 379/100, 93, 94, 96, 379/97, 98; 358/400, 468

[56] References Cited

U.S. PATENT DOCUMENTS

| | | | |
|---|---|---|---|
| 4,646,289 | 2/1987 | Tsiakas et al. | 379/93 |
| 4,773,080 | 9/1988 | Nakajima et al. | 379/100 |
| 4,805,210 | 2/1989 | Griffith, Jr. | 379/93 |
| 4,893,331 | 1/1990 | Horiuchi et al. | 379/93 |
| 4,942,600 | 7/1990 | Suzuki | 379/100 |
| 5,014,296 | 5/1991 | Saigano | 379/100 |
| 5,022,071 | 6/1991 | Mozer et al. | 379/100 |
| 5,027,385 | 6/1991 | Nakagawa et al. | 379/100 |
| 5,093,857 | 3/1992 | Yoshida et al. | 379/100 |
| 5,142,567 | 8/1992 | Watanabe | 379/100 |
| 5,222,126 | 6/1993 | Nishino | 379/100 |

FOREIGN PATENT DOCUMENTS 364867 4/1990 European Pat. Off. .
8903626 4/1989 WIPO .

OTHER PUBLICATIONS

Pat. Abs. Jp. vol. 12, No. 474, Dec. 12, 1988 and JP-A-63191456.

*Primary Examiner*—Curtis Kuntz
*Assistant Examiner*—Jason Chan
*Attorney, Agent, or Firm*—Fitzpatrick, Cella, Harper & Scinto

[57] ABSTRACT

A communication apparatus for carrying out a communication operation in accordance with a remote command from another communication apparatus sharing one line with the another communication apparatus comprises a communication unit, line switching unit for selectively connecting the line to the another communication apparatus or the communication unit a power supply for supplying a power to the another communication apparatus to form a current loop with the another communication apparatus, a detector for detecting a status of formation of the current loop of the another communication apparatus, and a control unit for carrying out the communication operation in accordance with the detection signal of the detector.

35 Claims, 7 Drawing Sheets

COMMUNICATION APPARATUS

This application is a continuation of application Ser. No. 07/826,821 filed Jan. 28, 1992 now abandoned.

BACKGROUND OF THE INVENTION

1. Field of the Invention

The present invention relates to a communication apparatus which shares a single line with another communication apparatus and performs a communication operation in accordance with a remote command from the another communication apparatus.

2. Related Background Art

A facsimile apparatus which shares a single telephone line with a telephone set and performs a facsimile Communication in accordance with a remote command from the telephone set has been known in the art. Such a facsimile apparatus is installed remotely from the telephone set and is connected through a network control unit (NCU). A user responds to a call signal from the line, and if the calling station is a facsimile terminal, the user manipulates a hook switch of the telephone set or a dialing ten-key to switch the line from the telephone set to the facsimile apparatus so that the facsimile reception is carried out (remote reception).

Figure 4:
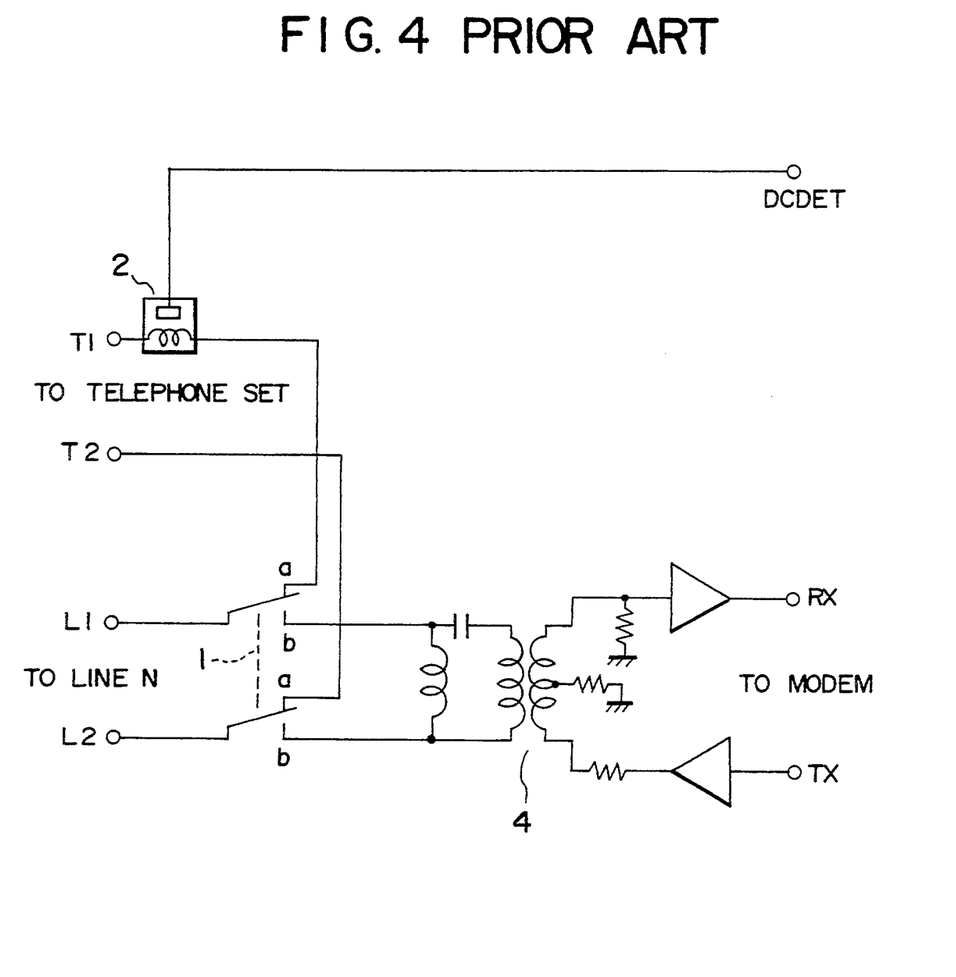
FIG. 4 shows a configuration of a prior art network control unit.

The NCU of the facsimile apparatus is configured as shown in FIG. 4.

In FIG. 4, a telephone line is connected to terminals L1 and L2, and a telephone set is connected to terminals T1 and T2. Numeral 1 denotes a CML relay which switches the telephone line between the telephone set and a modem. In a non-communication status, the CML relay 1 is connected to a so that the line is connected to the telephone set.

When a remote reception is to be carried out, a user depresses a hook switch of the telephone set for hooking to temporarily (usually less than one second) open the line. When the user does the hooking, a control unit of the facsimile apparatus detects the hooking by a current sensor 2 and switches the CML relay 1 to the modem (b) to carry out the communication.

Figure 5:
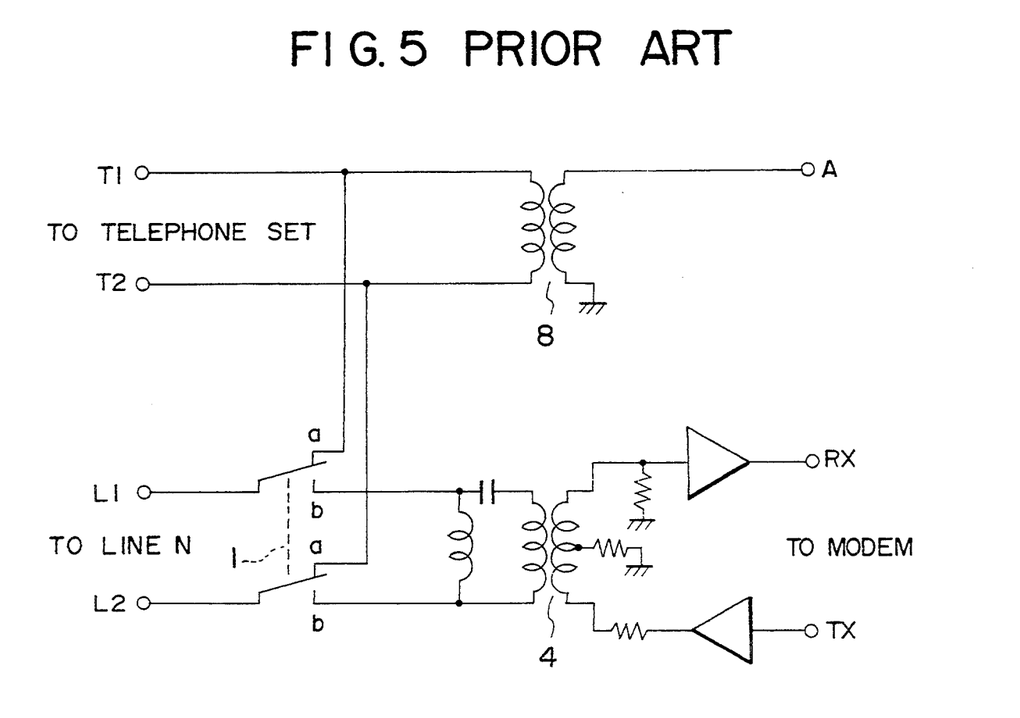
FIG. 5 shows a configuration of another prior art network control unit.

Another configuration is shown in FIG. 5. In FIG. 5, when the user off hooks the telephone set in response to a call signal from the line and recognizes the calling station is a facsimile terminal, he/she manipulates the telephone set to dial a predetermined number (output a DTMF signal) in order to remotely receive the facsimile communication. The DTMF signal is sent from the terminals T1 and T2 to a terminal A through a transformer 8. A DTMF receiver is connected to the terminal A and the control unit recognizes the number outputted by the telephone set based on the output of the DTMF receiver. If it is the number for the remote reception, the control unit switches the CML relay 1 to b to carry out the communication. In this manner, the remote reception is attained.

However, in the switching by the hooking described above, the hooking is generated by the user by depressing the hook switch of the telephone set for a short period. Accordingly, depending on the duration of hooking, a switching unit may determine it as the opening of the line and disconnect the line, or the hooking of a given duration may be determined as the opening of the line or may not be determined depending on the switching unit. Thus, the remote reception is very unreliable.

Further, even if the remote reception normally operates, the user can hear nothing from the telephone set and cannot confirm whether the remote reception is successful or not.

Where the CML relay is switched by the DTMF signal, the DTMF detector may misoperate by a DTMF signal due to crosstalk on the line so that the CML relay may be switched during the speech communication to break off the speech.

Further, if the number for the remote reception is included in the number dialed by the user to call a destination, the CML relay is switched and the user cannot call. In order to solve the above problem, it has been proposed to limit the remote reception to a predetermined period after the reception of the call, but it is still not perfect because it does not permit the start of polling by the remote control and because of malfunction due to crosstalk from other lines.

The control of the facsimile apparatus by the remote telephone set is disclosed in U.S. patent application Ser. Nos. 372,622 (filed on Jun. 28, 1989); 453,364 (refiled on Dec. 20, 1989); 659,463 (refiled on Feb. 25, 1991); and 670,461 (refiled on Mar. 13, 1991).

However, no proposal to solve the above problems has been made.

SUMMARY OF THE INVENTION

It is an object of the present invention to improve a communication apparatus in the light of the above problems.

It is another object of the present invention to provide a communication apparatus which is free from malfunction when it is remotely operated by an external terminal.

It is a still another object of the present invention to provide a communication apparatus which functions to form a current loop with another terminal which shares the same line, detects the status of formation of the current loop by the another terminal and carries out the communication in accordance with the detected status.

It is a still another object of the present invention to provide a communication apparatus which detects the status of formation of the current loop of the line-by the another terminal, disconnects the another terminal from the line in accordance with the detected status and carries out the communication in accordance with the remote control signal from the another terminal.

Other objects of the present invention will be apparent from the following detailed description of the preferred embodiments and the accompanying drawings.

DETAILED DESCRIPTION OF THE PREFERRED EMBODIMENTS

The preferred embodiments of the present invention are now explained in detail with reference to the accompanying drawings.

Figure 1:
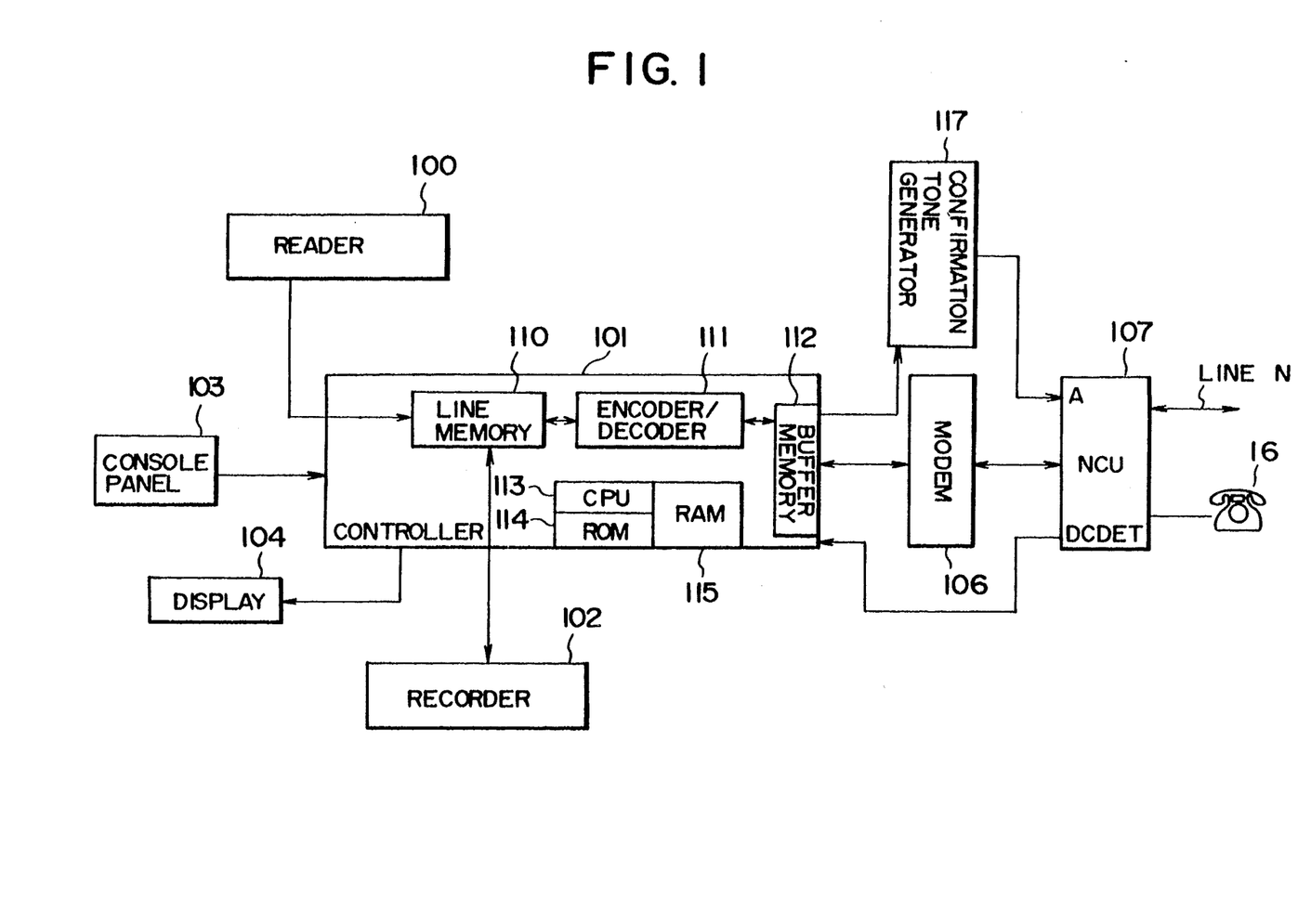
FIG. 1 shows a block diagram of a configuration of a facsimile apparatus in accordance with one embodiment of the present invention.

FIG. 1 shows a block diagram of a configuration of a facsimile apparatus in accordance with one embodiment of the present invention. Numeral 101 denotes a control unit comprising a microprocessor which includes a CPU 113, a read-only memory (ROM) 114, a random access memory (RAM) 115, a buffer memory 112, a line memory 110 and an encoder/decoder 111. It controls the image input/output and the entire communication process.

The ROM 114 stores a control program to be described later and the RAM 115 is used as a work area for the CPU 113.

The image input and output are carried out by a reader 100 and a recorder 102, respectively.

Document image data is read by the reader 100 which comprises a CCD (charge coupled device) sensor and a document feeder. Received image data or image data read by the reader 100 in a copy mode is recorded by the recorder 102 which comprises a thermal printer or an ink jet printer.

The input/output of the image data between the reader 100 or the recorder 102 and the encoder/decoder 111 is carried out through a line memory 110 one line at a time. The data input/output between the encoder/decoder 111 and a communication line is controlled through a buffer memory having more than one line of processing unit (for example, a predetermined number of pages).

The encoder/decoder 111 encodes and decodes to suppress redundancy and it may comprise software of the CPU 113.

The connection with a center line N such as a telephone line and the data input/output are carried out by a modem 106 and a network control unit (NCU) 107. A telephone set or an auto-response telephone set 16 for speech communication and manual control is connected to the NCU 107.

A console panel 103 comprises a ten-key for entering a telephone number and various function keys. A display 104 for displaying a telephone number and time is mounted on the console panel 103.

Figure 2:
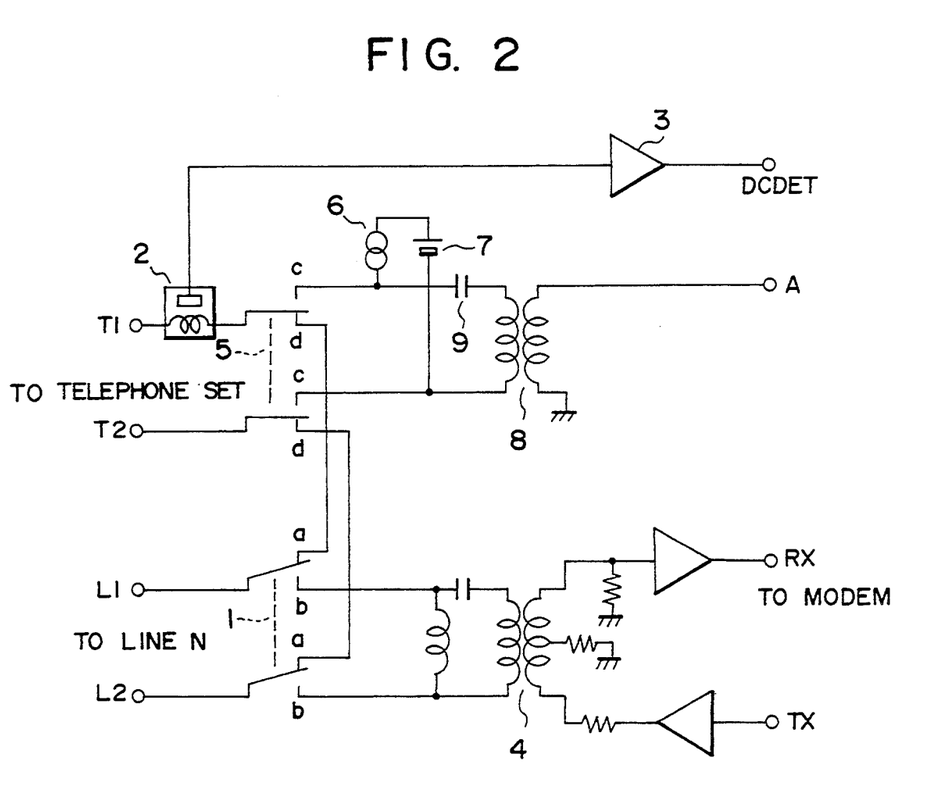
FIG. 2 shows a circuit diagram of a network control unit of the embodiment.

FIG. 2 shows the NCU of the present embodiment. Numeral 1 denotes a CML relay, and numeral 2 denotes a current sensor which comprises a coil and a Hall element arranged in the vicinity of the coil and insulated from the coil. The coil generates a magnetic field which is proportional to a current flowing through the coil and the Hall element converts the magnetic field to a current which is proportional to the magnetic field so that an output current which is proportional to the coil current is generated. The output of the current sensor 2 is supplied to a comparator 3 which produces a DCDET signal indicating the presence or absence of the current.

The DCDET signal is supplied to the control unit 101.

Numeral 7 denotes a power supply for supplying a DC voltage to the telephone set, numeral 6 denotes a constant current circuit for increasing an AC. impedance of the power supply 7, numeral 5 denotes a relay for connecting the telephone line to the line or the DC power supply, and numeral 8 denotes a transformer.

A remote reception operation in the above configuration is now explained with reference to FIG. 3 which shows the operation of the control unit 101 (CPU 113). This process is stored in the ROM 114.

Figure 3:
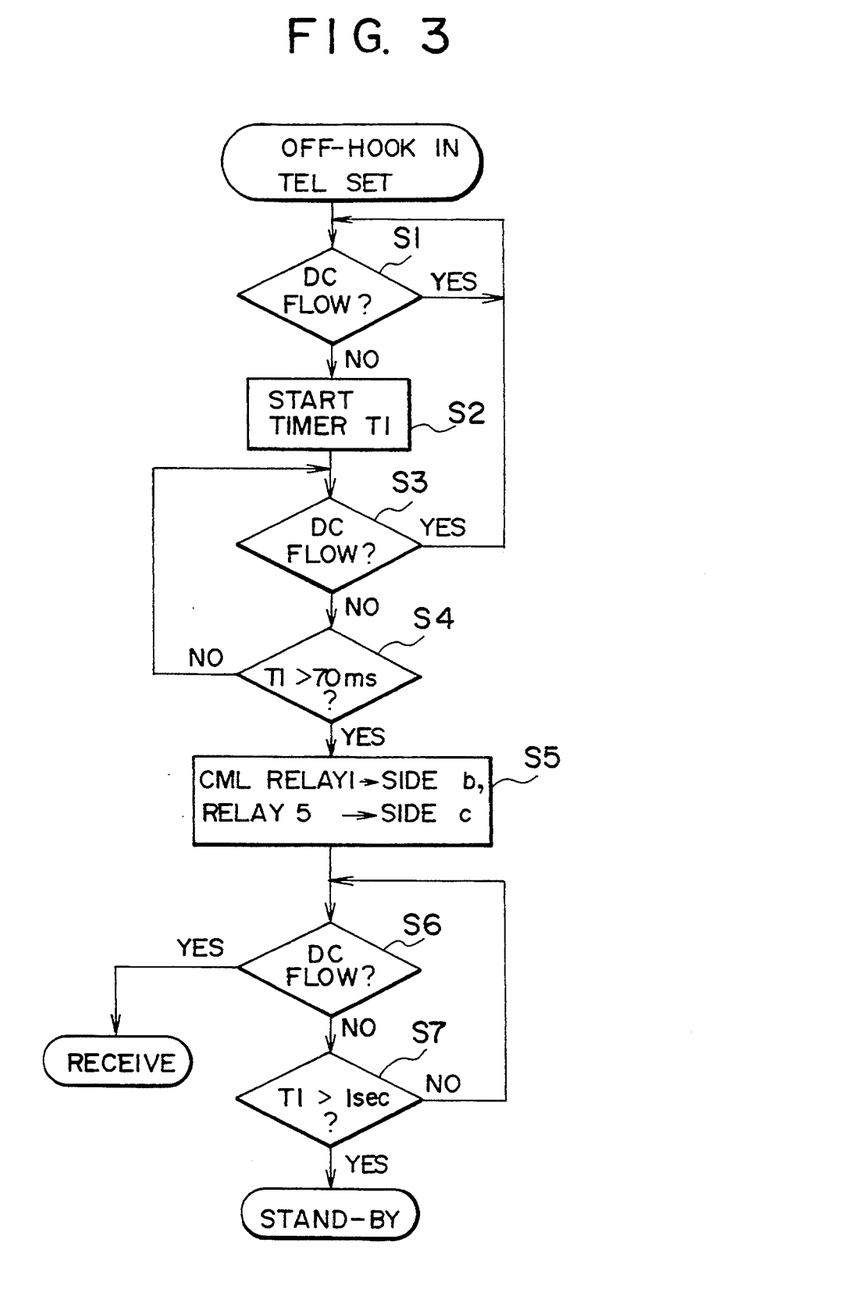
FIG. 3 shows a flow chart of a control operation of a control unit of the embodiment.

In FIG. 3, when the telephone set 16 is off-hooked by the DCDET signal, the control unit 101 advances a control process to a step S1. The status of the relays is shown in FIG. 2. In the step S1, the DCDET signal is further monitored, and if a DC current is detected, the process loops in the step S1. When the DC current disappears, the process proceeds to a step S2 to determine off-hooking or on-hook. In the step S2, a software timer T1 (as which a counter provided in the RAM L15 is used) for counting a line open time is initialized and the counting is started. Where the line is opened and the timer T1 does not reach 70 ms, the process loops in steps S3 and S4. The count 70 ms corresponds to a break time of a dialing pulse of 10 pps having a make factor of 33% (the line open time 67 ms) plus a margin. If a DC current flows before the elapse of 70 ms, the line opening is regarded as a non-significant signal such as a dialing pulse or a noise and the process returns to the step S1. If the line opening continues for longer than 70 ms, the process proceeds to a step S5 to switch the CML relay 1 to b to again capture the line. Since the line is not opened for longer than 70 ms, the line which is not disconnected when the dialing pulse is sent will not be disconnected. The relay 5 is switched to c so that a DC voltage is applied to the telephone set 16 from the DC power supply 7 through the constant current circuit 6. Whether the hook switch is depressed or not is detected by the current sensor 2. A confirmation sound generated by a confirmation sound generator 117 is applied to the telephone set 16 through a transformer 8 and a DC blocking capacitor 9. The process then proceeds to a step S6 and loops in the step S6 and S7 until the DC current disappears and the timer T1 reaches one second. If the DC-current is detected before the timer T1 reaches one second, it is regarded as the hooking and the process proceeds to a reception step (remote reception). If the timer T1 exceeds one second, it is regarded as the on-hook of the handset and the control returns to the stand-by state. Thus, the remote reception is attained when the user depresses the hook switch of the telephone set 16 within one second, and substantially within the same break of line as that caused by the dialing pulse takes place.

In the present embodiment, the facsimile communication is started by the hooking of the telephone set 16. Another embodiment in which the facsimile communication is started by the DTMF signal from the telephone set is explained below.

Figure 6:
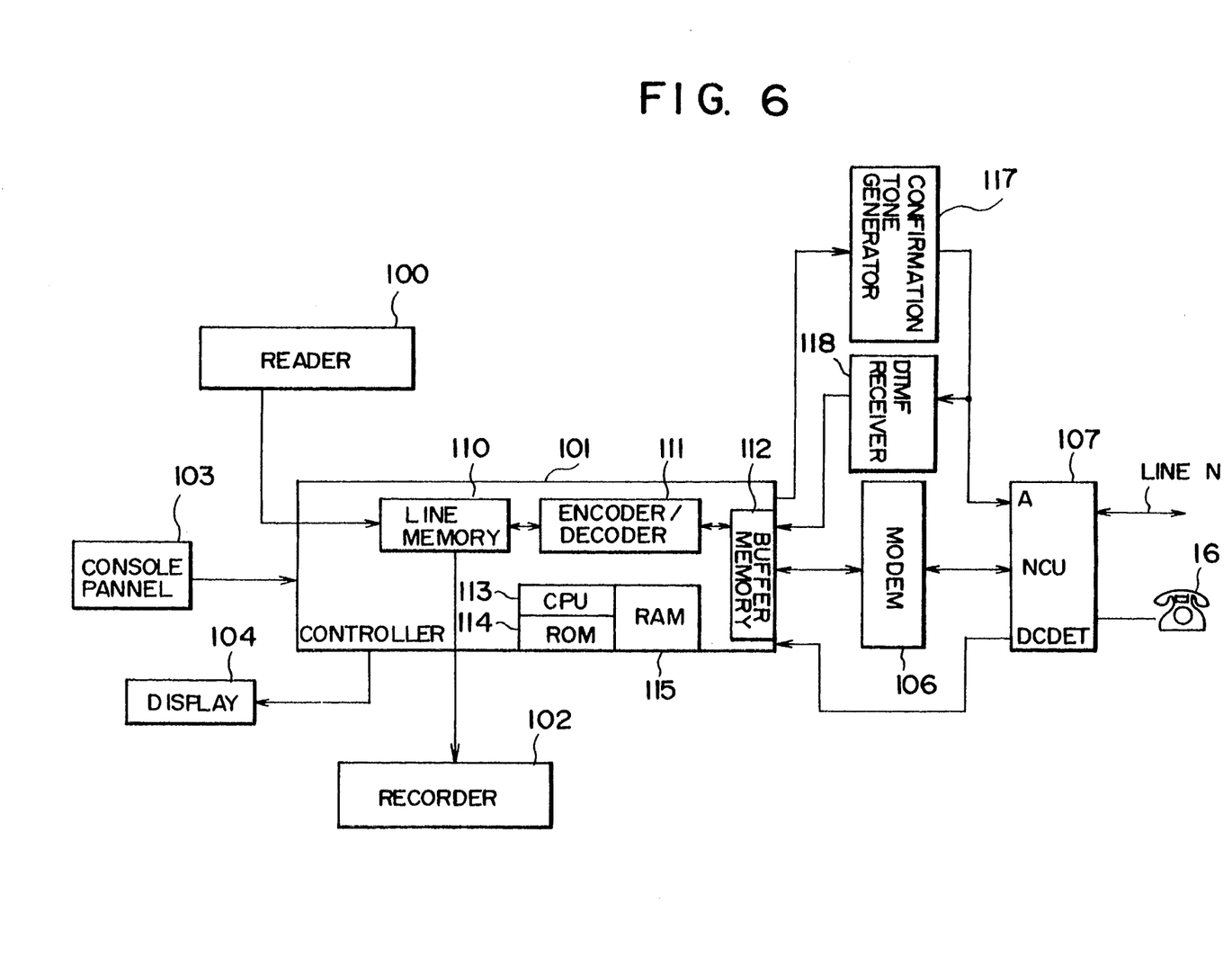
FIG. 6 shows a block diagram of a configuration of a facsimile apparatus in accordance with another embodiment of the present invention.

FIG. 6 shows a block diagram of a configuration of the facsimile apparatus of the other embodiment. In FIG. 6, the like numerals to those shown in FIG. 1 designate the like elements and the explanation thereof is omitted. In FIG. 6, a DTMF receiver 118 is added to the configuration of FIG. 1 and it is connected to the terminal A of the network control unit 107 (FIG. 2).

The remote reception operation in the above configuration is explained with reference to FIG. 7, which shows an operation of the control unit 101 (or the CPU 113). The process shown in FIG. 7 is stored in the ROM 114.

Figure 7:
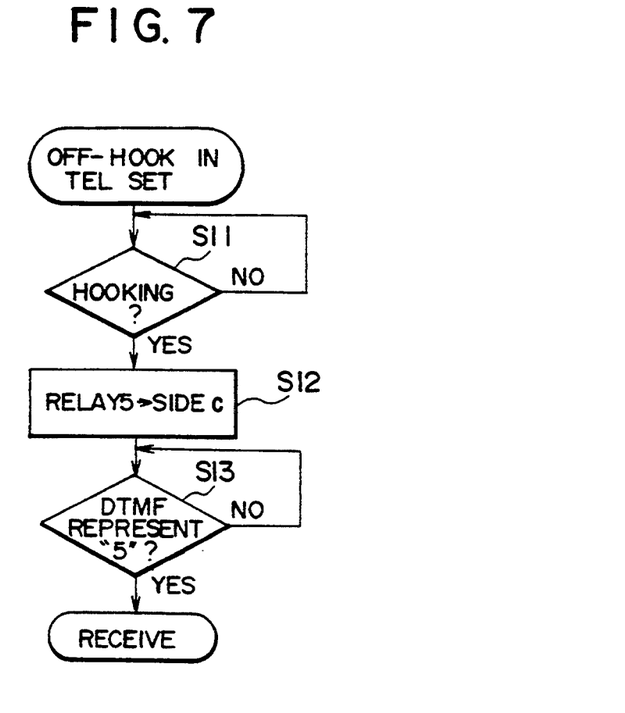
FIG. 7 shows a flow chart of a control operation of a control unit of the other embodiment.

In FIG. 7, when the telephone set is off hooked by the DCDET signal, the control unit 101 proceeds its control to a step S11. The status of the relays is shown in FIG. 2. The DTMF receiver is disconnected from the line at the terminal C of the relay 5 so that the remote reception is not started by the DTMF signal generated by the telephone set for the call.

In the step S11, the DTDET signal is further monitored, and if no current is detected for 0.5–1.5 second, it is regarded as the hooking and the process proceeds to a step S12. If there is no hooking, the process loops in the step S11. In a step S12, the relay 5 is switched to c so that the DC current is supplied to the telephone set 16 from the DC power supply 7 through the constant current circuit 6. In a step S13, the control unit monitors the output of the DTMF receiver 117 to check if the digit "5" for the DTMF is dialed. If it is dialed, the telephone set is connected to the DTMF receiver but since the line is disconnected at the terminal d of the relay 5, there is no risk of malfunction due to the crosstalk. When the user dials "5" from the telephone set, the "5" in the DTMF signal appears at the terminal A of the NCU from the terminals $T_1$ and $T_2$ through the contact c of the relay 5, a capacitor 9 and the transformer 8 and it is supplied to the DTMF receiver. When the control unit recognizes it, it proceeds to the reception so that the remote reception is attained. Accordingly, the remote reception is attained in either calling mode or called mode without risk of malfunction due to the crosstalk.

While the remote reception has been described above, other functions of the facsimile apparatus may also be remotely controlled such as the outputting of a communication control report by the remote control or the transmission of the image stored in the memory to other facsimile apparatus.

while the facsimile apparatus which carries out the facsimile communication in accordance with the remote command from the telephone set has been described, the remote command need not be sent by the telephone set but may be sent by other unit. Further, the communication apparatus to be remotely communicated is not limited to the facsimile apparatus but it may be other apparatus such as a teletex apparatus.

What is claimed is:

1. A communication apparatus comprising:
    communication means for performing communication via a communication line;
    line switching means for selectively connecting the communication line to a communication terminal or said communication means;
    measuring means for measuring a period of a line opening of the communication line;
    capture means for capturing the communication line when a first period of the line opening is measured by said measuring means; and
    control means for controlling a communication operation when a second period of the line opening, which is longer than the first period, is measured by said measuring means.

2. A communication apparatus according to claim 1, wherein said capture means applies a DC voltage to the communication terminal when the first period of the line opening is measured by said measuring means.

3. A communication apparatus according to claim 1, wherein said capture means applies a DC voltage as well as an AC signal to the communication terminal when the first period of the line is measured by said measuring means.

4. An apparatus according to claim 1, wherein said measuring means measures a keep-on time period of the line opening of the communication line, and said capture means captures the communication line when a keep-on time period equal to the first period is measured by said measuring means.

5. An apparatus according to claim 1, wherein said measuring means measures a keep-on time period of the line opening of the communication line, and said communication means starts communication when a keep-on time period equal to the second period is measured by said measuring means.

6. An apparatus according to claim 1, wherein said communication means conducts a facsimile communication.

7. An apparatus according to claim 1, wherein the communication terminal conducts speech communication.

8. An apparatus according to claim 1, wherein said measuring means includes a current sensor.

9. An apparatus according to claim 1, wherein said line switch means includes a relay.

10. An apparatus according to claim 1, wherein said capture means captures the communication line when the line opening is kept on for the first period, and said control means control said communication means to start communication when the line opening is kept on for the second period longer than the first period.

11. An apparatus according to claim 1, wherein the first period corresponds to a keep-on time period of the line opening of a dial signal, and the second period corresponds to a keep-on time period of the line opening of a hooking signal.

12. An apparatus according to claim 1, further comprising forming means for forming a loop between said line switching means and the communication terminal.

13. A communication apparatus comprising:
    communication means for performing communication via a communication line;
    line switching means for selectively connecting said communication line to a communication terminal or said communication means;
    reception means for receiving a dial signal from the communication terminal;
    timing means for timing a period of line disconnection of the communication line;
    detecting means for detecting a line connection after said timing means indicates that the line disconnection of the communication line has existed for a predetermined period; and
    control means for controlling said communication means in response to both of said reception means and said detection means.

14. A communication apparatus according to claim 13 wherein the dial signal is a specific DTMF signal.

15. An apparatus according to claim 13, wherein said control means includes second line switching means for selectively connecting the communication terminal to the communication line or said reception means, and said second line switching means is controlled to connect the communication terminal to said reception means to thereby activate said reception means.

16. An apparatus according to claim 13, wherein said communication means conducts a facsimile communication.

17. An apparatus according to claim 13, wherein the communication terminal conducts a speech communication.

18. An apparatus according to claim 13, wherein said reception means includes a current sensor.

19. An apparatus according to claim 13, wherein said line switching means includes a relay.

20. An apparatus according to claim 13, wherein said control means disconnects the communication terminal from the communication line.

21. A method for starting a communication operation of a second communication apparatus in accordance with an instruction from a first communication apparatus sharing a communication line with the second communication apparatus, comprising the steps of:
   measuring a period of line opening of the communication line;
   capturing the communication line when a first period of the line opening is measured in said measuring step; and
   starting the communication operation of the second communication apparatus when a second period of the line opening is measured in said measuring step.

22. A method for starting a communication operation according to claim 6 wherein a DC current is applied to said first communication apparatus.

23. A method for starting a communication operation according to claim 21 wherein a DC current and an AC signal are applied to said first communication apparatus.

24. A method for starting a communication operation according to claim 21, wherein the first communication apparatus is disconnected from the communication line in accordance with the first period of the line opening measured in said measuring step.

25. A method according to claim 21, wherein in said measuring step, a continuation time of the line opening of the communication line is measured, and said starting step starts the communication operation in accordance with the continuation time of the line opening.

26. A method according to claim 21, wherein in said capturing step, the communication line is captured by connecting the communication line and the second communication apparatus.

27. A method according to claim 21, wherein the second communication apparatus conducts a facsimile communication.

28. A method according to claim 21, wherein the first communication apparatus conducts speech communication.

29. A method according to claim 21, wherein in the measuring step, a current sensor is used to detect the line opening of the communication line.

30. A method according to claim 21, further comprising the step of selectively connecting a communication unit of the second communication apparatus or the first communication apparatus to the communication line by switching a relay.

31. A method according to claim 21, wherein in the capturing step the communication line is captured when the line opening is kept on for the first period, and in the starting step the communication operation is started when the line opening is kept on for the second period longer than the first period.

32. A method according to claim 21, wherein the first period corresponds to a keep-on time of the line opening of a dial signal and the second period corresponds to a keep-on time of the line opening of a hooking signal.

33. A method according to claim 21, further comprising the step of forming a loop between the first communication apparatus and the second communication apparatus.

34. A method according to claim 21, further comprising the step of disconnecting the first communication apparatus in accordance with the period of line opening measured in said measuring step.

35. A control method for controlling a data communication unit, wherein the data communication unit or a communication terminal is connected to a communication line selectively, said method comprising the steps of:
   timing a period of line disconnection of the communication line from the data communication unit;
   detecting a line connection to the data communication unit after said timing step indicates that the line disconnection of the communication line has existed for a predetermined period;
   receiving a dial signal from the communication terminal; and
   controlling the data communication unit in response to both of a detection result in said detecting step and a reception result in said receiving step.

* * * * *

UNITED STATES PATENT AND TRADEMARK OFFICE
CERTIFICATE OF CORRECTION

PATENT NO. : 5,428,675
DATED : June 27, 1995
INVENTOR(S) : HISAO TERAJIMA

It is certified that error appears in the above-identified patent and that said Letters Patent is hereby corrected as shown below:

COLUMN 4

Line 13, "RAM L15" should read --RAM 115--.
    Line 36, "step S6" should read --steps S6--.

COLUMN 5

Line 4, "DTDET" should read --DCDET--.

COLUMN 6

Line 19, "switch" should read --switching--.
    Line 23, "control" (second occurrence) should read --controls--.

COLUMN 7

Line 22, "claim 6" should read --claim 21,--.

Signed and Sealed this

Sixteenth Day of January, 1996

Attest:

Attesting Officer

BRUCE LEHMAN

Commissioner of Patents and Trademarks